Jan. 11, 1966 J. O. M. VAN LANGEN ETAL 3,228,092

MAGNETIC HEADS WITH BONDING GAP SPACERS

Filed Aug. 14, 1961

INVENTORS
JOHANNES O. M. VAN LANGEN
THEO T. BOERSMA
BY
Frank R. Trifari
AGENT

United States Patent Office 3,228,092

Patented Jan. 11, 1966

3,228,092

MAGNETIC HEADS WITH BONDING GAP SPACERS

Johannes Otto Michael van Langen and Theo Tjalke Boersma, Eindhoven, Netherlands, assignors to North American Philips Company, Inc., New York, N.Y., a corporation of Delaware Filed Aug. 14, 1961, Ser. No. 131,431
Claims priority, application Netherlands, Sept. 27, 1960, 256,303
2 Claims. (Cl. 29—155.5)

Figure 1:
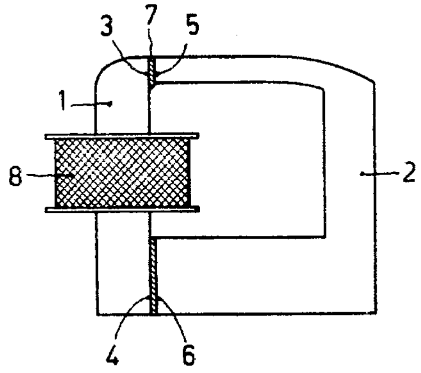

This invention relates to annular magnetic heads for recording, reproducing and/or erasing magnetic recordings, and in particular to such heads comprising at least two circuit parts of sintered oxidic ferromagnetic material (also known as ferrite) separated by a useful gap filled with non-magnetic material which serves to protect the gap and also to mechanically bond the two circuit parts to each other.

The term "annular magnetic head," as used herein, means a magnetic head the circuit parts of which in the assembled state enclose a central space in which one or more coils may be housed.

It is already known to use synthetic material as the non-magnetic material, for example aethoxyline resin and polyester resin. A reasonably good junction is obtained with such synthetic materials, although it remains necessary to utilize thrust discs or laterally clamping springs, despite the adhesive properties of such synthetic materials. In addition, because of their low resistivity to wear, such synthetic materials are ground away fairly soon during operation with the result that the edges of the gap are deprived of the protective influence of the non-magnetic material in the gap. The unprotected edges are found to crumble off due to the scouring action of the carrier. Also it is very difficult to obtain small gap lengths (of the order of a few microns) and it is no simple task accurately to adjust such a length.

In order to avoid these difficulties, it has previously been suggested to use glass as the non-magnetic material and also as the bonding means.

In this method, the glass in the form of a foil or sheet is placed between the gap-forming surfaces of two circuit parts; then the assembly is heated to the softening range of the glass and compressed at a temperature located in this softening range, and at a pressure such that, after the glass has hardened, the gap has acquired the correct length. During this process the glass adheres to the ferromagnetic circuit parts and bonds them together.

Such adhesion of the glass is found to have a mechanical rigidity substantially equal to that of the circuit parts themselves.

However, the use of glass foils in the bulk manufacture of such magnetic heads has the following disadvantages. It is difficult to obtain a large number of such foils in regular pieces of the desired size and foils with a thickness of several microns are readily damaged because of their dimensions.

Another method of providing the glass is the following. Each of the two gap-forming surfaces is covered with a thin layer of glaze paste. After the layers have hardened, the circuit parts are pressed against each other while simultaneously heating to a temperature at which the glaze melts. After cooling, the two layers have united into a single layer joining the circuit parts.

The last-mentioned method has the disadvantage that it is very difficult to obtain small gap lengths, since the glaze paste cannot be provided on the gap-forming surfaces in layers which are thin enough.

An object of the invention is to mitigate these disadvantages. According to one aspect of the invention, water-glass is used as the non-magnetic material which thus serves both to protect the gap and mechanically to bond together the circuit parts.

The invention also relates to a method of manufacturing magnetic heads using water-glass as the non-magnetic material, in which at least one of the gap-forming surfaces of the circuit parts, which have been accurately processed, for example polished, is provided with a liquid layer of water-glass, then the circuit part covered with such a layer is heated to a temperature such that the layer fuses, and subsequently the accurately processed gap-forming surfaces of the circuit parts are placed against each other; the resulting assembly is then heated to a temperature at which the circuit parts adhere together with the aid of the water-glass present between the gap-forming surfaces, such adhesion being effected at a pressure such that, after cooling, the gap has the correct length.

It will be evident that the amount of pressure and the time of action are dependent upon the properties of the water-glass employed, upon the surface of the useful gap and also upon the temperature at which the pressure is exerted.

Figure 2:
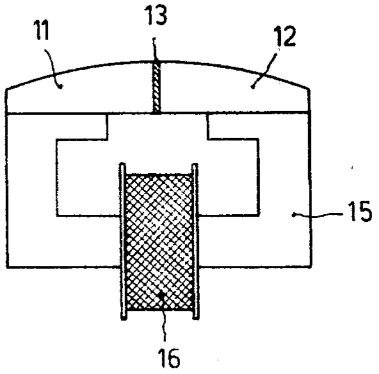

In order that the invention may be readily carried into effect, two embodiments thereof will now be explained in detail, by way of example, with reference to the accompanying diagrammatic drawing, in which:

FIGURE 1 shows one embodiment in which a magnetic head having two gaps is formed; and FIGURE 2 shows another embodiment of a magnetic head having one gap.

FIGURE 1 shows circuit parts 1 and 2, consisting of sintered oxidic ferromagnetic material. Each circuit part has two accurately-processed surfaces 3, 4 and 5, 6 respectively. The air-gap formed between the surfaces 3 and 5 and along which the magnetic record carrier is guided, is filled with non-magnetic material 7 in the form of water-glass.

By preferably providing that the contact area of the surfaces 4 and 6 is large relative to the contact area of the surfaces 3 and 5, the magnetic reluctance resulting from the gap between the surfaces 4 and 6 is low relative to the magnetic reluctance resulting from the gap between the surfaces 3 and 5. The junction of the surfaces 4 and 6 may be obtained in any desired manner. For example, water-glass may likewise be used to bond the surfaces 4 and 6.

If water-glass is used for the adhesion of the surfaces 4 and 6, then in the manufacture of such a head the surfaces 3 and 4 and, if desired, also the surfaces 5 and 6 are first covered with thin liquid layers of water-glass. Such covering of the surfaces with water-glass layers may be effected, for example, by dipping the surfaces, after having been thoroughly degreased, in a suitably diluted solution of water-glass. An example of such a solution which yielded satisfactory results contained from 7% to 9% by weight of $Na_2O$ and from 24% to 27% by weight of $SiO_2$.

The liquid water-glass is then allowed to dry into solid layers at comparatively low temperatures (for example at room temperature or, for example, at about 60° C.), after which it is heated to a temperature such, in the example up to 800° to 900° C., that the layers fuse.

Subsequently, the accurately-processed surfaces of the circuit parts are placed against each other, at least one of each two engaging surfaces (3, 5 and 4, 6 respectively) being covered with a thin fused layer of water-glass.

The resulting assembly is then heated to a temperature at which the water-glass layer present on one of two engaging surfaces also adheres to the ferromagnetic material of the other of these surfaces, or unites with the water-glass layer present on the other surface, to form a single layer. This temperature is, in the example, also about 800° to 900° C.

During heating and during the subsequent cooling period, the two circuit parts are pressed together at a pressure such that, after cooling, a gap of the desired length exists between the surfaces 3 and 5.

After cooling of the assembly, the guide surface at the upper side of the head is provided by accurate processing, for example polishing.

In the example shown in FIGURE 1, the circuit part 1 is surrounded by a coil 8.

FIGURE 2 shows a second embodiment of a magnetic head according to the invention. Circuit parts 11 and 12 are separated by a gap 13 filled with water-glass which serves as non-magnetic material to protect the gap and also serves mechanically to bond the two circuit parts; these circuit parts constitute in this example only the pole piece of the head. The head is completed by a closure yoke 15 which carries a coil 16. The pole piece may be connected to the closure yoke, for example with the aid of an adhesive or by mechanical means, such as a clasp.

The closure yoke preferably also consists of sintered oxidic ferromagnetic material.

What is claimed is:

1. A method of manufacturing a magnetic head comprising: covering with a thin liquid layer of water-glass at least one of two gap-forming processed surfaces of a pair of circuit parts composed of sintered oxidic ferromagnetic material, heating the water-glass to a temperature at which it fuses, placing said surfaces in a position such that they are opposite each other with the water-glass being located between the surfaces, heating the resulting assembly to a temperature at which the circuit parts are bonded together by means of the water-glass between the surfaces, pressing the surfaces toward each other during the second heating step until a predetermined gap length between said surfaces is attained, and thereafter cooling said assembly.

2. A method of manufacturing a magnetic head comprising: covering with a thin liquid layer of water-glass at least one of two gap-forming processed surfaces of a pair of circuit parts composed of sintered oxidic ferromagnetic material, drying the water-glass, heating the water-glass to a temperature at which it fuses, placing said surfaces in a position such that they are opposite each other with the water-glass being located between the surfaces, heating the resulting assembly to a temperature at which the circuit parts are bonded together by means of the water-glass between the surfaces, pressing the surfaces toward each other during the second heating step until a predetermined gap length between said surfaces is attained, and thereafter cooling said assembly.

References Cited by the Examiner

UNITED STATES PATENTS

| | | | |
|---|---|---|---|
| 2,728,054 | 12/1955 | Albers-Schoenberg | 336—178 |
| 2,915,812 | 12/1959 | Rettinger | 29—155.59 |
| 2,919,312 | 12/1959 | Rosenberger et al. | 179—100.2 |
| 2,943,384 | 7/1960 | Wisner | 29—155.59 |
| 3,024,318 | 3/1962 | Duinker et al. | 179—100.2 |

WHITMORE A. WILTZ, *Primary Examiner.*

BERNARD KONICK, JOHN F. CAMPBELL, *Examiners.*